US012571421B2

(12) United States Patent　　　(10) Patent No.: US 12,571,421 B2

Merritt et al.　　　(45) Date of Patent: Mar. 10, 2026

(54) METAL PLATED ADDITIVELY MANUFACTURED PLASTIC SHAFTS AND THEIR METHOD OF MANUFACTURING

(71) Applicant: Hamilton Sundstrand Corporation, Charlotte, NC (US)

(72) Inventors: Brent J. Merritt, Southwick, MA (US); Viktor Kilchyk, Lancaster, NY (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 417 days.

(21) Appl. No.: 18/104,512

(22) Filed: Feb. 1, 2023

(65) Prior Publication Data

US 2024/0255018 A1　　Aug. 1, 2024

(51) Int. Cl.
　*F16C 3/02*　　　(2006.01)
　*B33Y 10/00*　　　(2015.01)
　　　(Continued)

(52) U.S. Cl.
　CPC .............. *F16C 3/026* (2013.01); *B33Y 10/00* (2014.12); *B33Y 40/20* (2020.01); *B33Y 70/10* (2020.01);
　　　(Continued)

(58) Field of Classification Search
　CPC ......... B33Y 10/00; B33Y 40/20; B33Y 70/10; B33Y 80/00; F01D 5/06; F01D 5/282;
　　　(Continued)

(56) References Cited

U.S. PATENT DOCUMENTS 7,927,708 B2　4/2011　Mizrahi
9,427,835 B2　8/2016　Cheung et al.
　　　(Continued)

FOREIGN PATENT DOCUMENTS

CA　　2917967 A1　1/2015
CN　101600817 A　12/2009
　　　(Continued)

OTHER PUBLICATIONS

"The Best of Both Worlds: a New Take on Metal-Plastic Hybrid 3D Printing", Waseda University, Oct. 5, 2020 [online], [retrieved on Feb. 27, 2023]. Retrieved from the Internet <URL: https://www.sciencedaily.com/releases/2020/10/201005101542.htm>.
　　　(Continued)

*Primary Examiner* — Josh Skroupa
(74) *Attorney, Agent, or Firm* — Kinney & Lange, P.A.

(57) ABSTRACT

A rotating shaft for a rotary machine includes a first shaft portion extending along and oriented about a central axis The first shaft portion includes a plastic substrate and metal plating disposed on at least apportion of an outer surface of the plastic substrate. The plastic substrate has a matrix material and fibers embedded in the matrix material. The fibers have a first coefficient of thermal expansion. The metal plating has a second coefficient of thermal expansion. The fibers are selected such that a bulk coefficient of thermal expansion of the plastic substrate at the outer surface of the plastic substrate substantially matches the second coefficient of thermal expansion of the metal plating.

19 Claims, 5 Drawing Sheets

(51) Int. Cl.
    *B33Y 40/20*           (2020.01)
    *B33Y 70/10*           (2020.01)
    *B33Y 80/00*           (2015.01)
    *F01D 5/06*            (2006.01)
    *F01D 5/28*            (2006.01)

(52) U.S. Cl.
    CPC ............... *B33Y 80/00* (2014.12); *F01D 5/06* (2013.01); *F01D 5/282* (2013.01); *F05D 2240/60* (2013.01); *F05D 2240/61* (2013.01); *F16C 2208/02* (2013.01); *F16C 2208/20* (2013.01); *F16C 2223/30* (2013.01); *F16C 2360/23* (2013.01)

(58) Field of Classification Search
    CPC ............... F01D 25/005; F05D 2240/60; F05D 2240/61; F05D 2300/5021; F05D 2300/50211; F05D 2300/50212; F05D 2300/603; F05D 2300/6034; F16C 3/026; F16C 7/026; F16C 2208/02; F16C 2208/04; F16C 2208/20; F16C 223/30; F16C 2360/23; F16C 2360/24; F16C 2223/30
    USPC ................................................. 464/181, 183
    See application file for complete search history.

(56) References Cited

U.S. PATENT DOCUMENTS

| | | |
|---|---|---|
| 9,777,593 B2 | 10/2017 | Kirkpatrick et al. |
| 9,920,429 B2 | 3/2018 | Carlsten et al. |
| 10,519,965 B2 | 12/2019 | Xie |
| 10,655,470 B2 | 5/2020 | Okabe et al. |
| 10,677,090 B2 | 6/2020 | Sakala et al. |
| 10,927,843 B2 | 2/2021 | Roach et al. |
| 11,268,526 B2 | 3/2022 | Roach et al. |
| 11,802,488 B2 | 10/2023 | Merritt et al. |
| 11,970,951 B1 | 4/2024 | Kilchyk et al. |
| 2012/0148391 A1 | 6/2012 | Ibaraki et al. |
| 2012/0263585 A1 | 10/2012 | Matsuyama |
| 2013/0001321 A1 | 1/2013 | Pelletier et al. |
| 2013/0121817 A1 | 5/2013 | Boehm et al. |
| 2013/0154194 A1 | 6/2013 | Van |
| 2013/0260130 A1 | 10/2013 | Taxacher et al. |
| 2014/0248156 A1 | 9/2014 | Parkos et al. |
| 2016/0160353 A1 | 6/2016 | Miarecki et al. |
| 2016/0160869 A1* | 6/2016 | Roach ..................... F01D 5/282 416/189 |
| 2016/0167791 A1 | 6/2016 | Roach et al. |
| 2016/0169012 A1 | 6/2016 | Dacunha et al. |
| 2019/0170254 A1 | 6/2019 | Taslakian et al. |
| 2020/0018260 A1 | 1/2020 | Garcia et al. |
| 2020/0157968 A1 | 5/2020 | Braun et al. |
| 2021/0054852 A1* | 2/2021 | Verma .................... B33Y 80/00 |
| 2021/0323245 A1 | 10/2021 | Lochner et al. |
| 2022/0145768 A1 | 5/2022 | Angel et al. |
| 2023/0085189 A1 | 3/2023 | Merritt et al. |
| 2023/0193047 A1* | 6/2023 | Gettings ................. F01D 5/288 106/14.05 |

| | | |
|---|---|---|
| 2023/0235672 A1 | 7/2023 | Albers |
| 2024/0254888 A1 | 8/2024 | Merritt et al. |
| 2024/0271727 A1 | 8/2024 | Kilchyk et al. |

FOREIGN PATENT DOCUMENTS

| | | | |
|---|---|---|---|
| CN | 102472115 B | 6/2015 | |
| DE | 102004039473 A1 | 3/2006 | |
| DE | 102007024130 A1 | 12/2008 | |
| DE | 102007048852 B4 | 2/2016 | |
| JP | 2021057980 A * | 4/2021 | ............... F16C 3/02 |
| RU | 2611137 C1 | 2/2017 | |
| WO | 2009031632 A1 | 3/2009 | |

OTHER PUBLICATIONS

A. Freier, "New 3D Printing Technique Allows for Better Control of Composite Material Fiber Orientation" Jan. 16, 2018 [online] [retrieved Feb. 27, 2023] <URL:https://all3dp.com/new-3d-printing-technique-allows-better-control-composite-material-fiber-orientation/>.

A. Pearson, et al., "Novel polyurethane elastomeric composites reinforced with alumina, aramid . . . " from Composite Part B: Engineering, vol. 122, Aug. 1, 2017, 6 pages <https://doi.org/10.1016/j.compositesb.2017.04.017>.

B. Coxworth. "Hybrid 3D printing tech produces plastic-metal items" New Atlas, Oct. 6, 2020 [online], [retrieved on Feb. 27, 2023]. Retrieved from the Internet <URL: https://newatlas.com/3d-printing/hybrid-3d-printing-plastic-metal-items/>.

G. Gardiner, "Magnetic 3D Printing the next generation of tailored composites", Jul. 26, 2019 [online], [retrieved on Feb. 27, 2023]. Retrieved from <URL:https://www.compositesworld.com/articles/magnetic-3d-printing-the-next-generation-of-tailored-composites>.

N. Giani, et al., "Towards sustainability in 3D printing of thermoplastic composites: Evaluation of recycled carbon fibers . . . ", from Composites Part A: Applied Sci & Mfg, vol. 159, Aug. 2022, 6 pages <https://doi.org/10.1016/j.compositesa.2022.107002>.

The Best of Both Worlds: a New Take on Metal-Plastic Hybrid 3D Printing, Waseda University, Oct. 5, 2020 [online], [retrieved on Feb. 27, 2023]. Retrieved from the Internet <URL: https://www.waseda.jp/top/en/news/73810>.

Extended European Search Report for EP Application No. 24154670.4, dated Jul. 23, 2024, 7 pages.

Extended European Search Report for EP Application No. 24155028.4, dated Jul. 15, 2024, 5 pages.

Extended European Search Report for EP Application No. 24155287.6, dated Jul. 15, 2024, 5 pages.

Extended European Search Report for EP Application No. 24155310.6, dated Jul. 15, 2024, 6 pages.

Extended European Search Report for EP Application No. 24155387.4, dated Jul. 15, 2024, 6 pages.

"Fiberglass Fabrics & Composites" JPS [online], Retrieved from the Internet <URL:https://jpscm.com/why-fiberglass/>, 2022, 5 pages.

"Plastic Thermal Expansion-Thermal Expansion of Engineering Thermoplastics" [online], Retrieved from the Internet <URL:https://www.azom.com/suppliers.aspx?SupplierID=1356>, 2020, 6 pages.

"Thermal Expansion of Metals", The Engineering Toolbox [online], Retrieved from Internet: URL:https://www.engineeringtoolbox.com/thermal-expansion-metals-d_859.html>, 2020, 7 pages.

* cited by examiner

50

Form, by additive manufacturing, a plastic substrate having an outer surface   52

Impregnate, by additive manufacturing, the plastic substrate with fibers having a first CTE to provide a bulk CTE of the substrate   54

Applying a metal plating to the outer surface, the metal plating having a second CTE substantially matching the bulk CTE of the substrate   56

METAL PLATED ADDITIVELY MANUFACTURED PLASTIC SHAFTS AND THEIR METHOD OF MANUFACTURING

BACKGROUND

The present disclosure relates generally to aviation components and, more particularly, to metal-plated plastic rotating shafts.

Metal-plated plastic aviation components have been developed as a lightweight, high-strength, alternative to metal components. Metal-plated plastic components include a plastic or plastic substrate coated with a metal plating on an outer surface. The metal plating increases the strength and abrasion resistance of the component. Metal-plated plastic components have been particularly attractive for use in gas turbine engine applications, where they can provide overall weight reduction of the engine to improve engine efficiency and provide fuel cost savings.

Limitations in use of metal-plated plastic components include poor adhesion between the metal plating and the plastic substrate, which reduces long-term component durability. Various methods of manufacture and mechanical locking features have been developed to improve an interfacial bond strength between the metal plating the plastic at variable temperatures, as separation of the metal plating can occur.

SUMMARY

In one aspect, a rotating shaft for a turbomachine includes a first shaft portion extending along and oriented about a central axis. The first shaft portion includes a plastic substrate and metal plating disposed on at least a portion of an outer surface of the plastic substrate. The plastic substrate has a matrix material and fibers embedded in the matrix material. The fibers have a first coefficient of thermal expansion. The metal plating has a second coefficient of thermal expansion. A bulk coefficient of thermal expansion of the plastic substrate at the outer surface of the plastic substrate substantially matches the second coefficient of thermal expansion of the metal plating.

In another aspect, a method of forming a rotating shaft for a turbomachine includes forming, by an additive manufacturing process, a plastic substrate having an outer surface, impregnating, by the additive manufacturing process, the plastic substrate with fibers having a first coefficient of thermal expansion, and applying a metal plating to the outer surface of the plastic substrate. The metal plating has a second coefficient of thermal expansion. A bulk coefficient of thermal expansion of the plastic substrate at the outer surface of the plastic substrate substantially matches the second coefficient of thermal expansion of the metal plating. The plastic substrate and the metal plating together form the rotating shaft having a first shaft portion extending along and oriented about a central axis.

The present summary is provided only by way of example, and not limitation. Other aspects of the present disclosure will be appreciated in view of the entirety of the present disclosure, including the entire text, claims and accompanying figures.

DETAILED DESCRIPTION

The present disclosure is directed to metal-plated additively manufactured plastic aviation rotating shaft components with controlled thermal expansion behavior to reduce component damage caused by operation in environments of varying temperature or temperature gradients.

Figure 1:
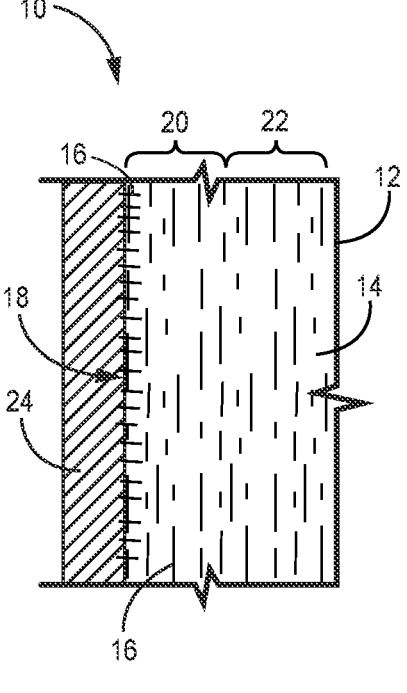
FIG. 1 is a simplified cross-sectional view of a portion of a metal-plated component.

FIG. 1 is a simplified cross-sectional view of a portion of a metal-plated plastic component. FIG. 1 shows component 10, substrate 12, matrix 14, fibers 16, outer surface 18, outer region 20, inner region 22, and metal plating 24. Component 10 can be a rotating shaft component of a turbomachine, including but not limited to a thrust shaft, a compressor and fan shaft, or a turbine shaft. Substrate 12 has outer surface 18, outer region 20, and inner region 22. Outer region 20 is adjacent to outer surface 18. Inner region 22 is separated from outer surface 18 by outer region 20. Substrate 12 includes matrix 14 and fibers 16. Fibers 16 are embedded in matrix 14. Metal plating 24 is disposed on outer surface 18 of substrate 12.

Substrate 12 includes matrix 14 and fibers 16. Matrix 14 is a plastic or polymer material. Matrix 14 can be a thermoplastic. Matrix 14 can include but is not limited to acrylonitrile butadiene styrene (ABS), polyetherimide (PEI), thermoplastic polyimide, polyether ether ketone (PEEK), polyether ketone ketone (PEKK), polysulfone, polyamide, polyphenylene sulfide, polyester, polyimide, and combinations thereof. Matrix 14 can define a shape of substrate 12. Matrix 14 can be formed of a plurality of materials with individual materials selectively located in substrate 12 to provide desired material properties in different regions of component 10. In some embodiments, substrate 12 can include one or more voids or open sections or structures, such as a hollow core or openings formed between internal support structures.

Fibers 16 are embedded in matrix 14. Fibers 16 are selected and arranged to control a bulk coefficient of thermal expansion (CTE) of substrate 12. Fibers 16 are selected and arranged in substrate 12 to reduce a CTE mismatch between substrate 12 and metal plating 24. Substrate 12 with fibers 16 can be designed to have a bulk CTE substantially matching a CTE of metal plating 24 to prevent separation of metal plating 24 from outer surface 18 during operation of component 10 in varying temperatures. Fibers 16 can be selected and arranged to meet additional functional requirements of component 10 including stress reduction and deflection management as described further herein.

Matrix 14 can be formed of a material having a CTE greater than the CTE of metal plating 24. Fibers 16 can be formed of material having a lower CTE than the CTE of matrix 14 to lower the bulk CTE of substrate 12. Fibers 16 constrain thermal expansion of substrate 12. Fibers 16 can include but are not limited to carbon, metal, para-aramid (e.g., Kevlar® and Twaron®), glass, and combinations thereof. In some embodiments, fibers 16 can be formed of the same material as metal plating 24. In some embodiments, subsets of fibers 16 can be formed of different materials. Regions of substrate 12 can include fibers 16 formed of the same material or different materials. The combinations of materials forming matrix 14 and fibers 16 can vary throughout a component to provide desired material properties.

Fibers 16 can be continuous fibers, discontinuous fibers, or combinations thereof. Fibers 16 can have a filament diameter and length selected to minimize cracking of substrate 12 caused by separation at fiber-matrix interfaces. A concentration and arrangement of fibers 16 can be selected to provide substrate 12 with a bulk CTE substantially matching the CTE of metal plating 24. As shown in FIG. 1, fibers 16 can be substantially uniformly distributed throughout matrix 14 to provide an entirety of substrate 12 with a bulk CTE substantially matching the CTE of metal plating 24. As discussed further herein, in some embodiments, fiber placement can be tailored to control a bulk CTE of one or more regions of substrate 12.

Fibers 16 can be disposed to extend parallel to outer surface 18 and metal plating 24 and/or perpendicular or otherwise angled relative to metal plating 24. Fibers 16 extending perpendicular to otherwise angled relative to metal plating 24 can extend through outer surface 18. Fibers 16 protruding through outer surface 18 can improve a bond between metal plating 24 and substrate 12. In some embodiments, a subset of fibers 16 can be disposed on or at outer surface 18. For example, fibers 16 can form a portion of outer surface 18 with individual fibers 16 separated by matrix 14. Fibers 16 disposed at outer surface 18 or protruding through outer surface 18 can be formed of a material capable of forming a high-strength bond with metal plating 24. Fibers 16 disposed at outer surface 18 or protruding through outer surface 18 can thereby improve a bond between metal plating 24 and substrate 12. For example, fibers 16 disposed at outer surface 18 or protruding through outer surface 18 can be formed of metal. In some embodiments, fibers 16 and metal plating 24 can be the same material. In some embodiments, a subset of fibers 16 formed of metal can be provided to improve bonding of metal plating 24, while bulk CTE of substrate 12 can be controlled primarily by a subset of fibers 16 formed of another material (e.g., carbon, para-aramid, or glass).

Selection of fiber 16 material, geometry, orientation relative to metal plating 24 and outer surface 18, and concentration can be made to provide substrate 12 with an expansion rate in outer region 20 in a plane parallel to metal plating 24 not exceeding the expansion rate of metal plating 24, while also improving a bond between substrate 12 and metal plating 24. While it is particularly important to control CTE mismatch between substrate 12 and metal plating 24 at the interface and an adjacent region to prevent separation of metal plating 24, it may not be necessary that all regions of substrate 12 have the same CTE as discussed further herein. In some embodiments, the composition of both fibers 16 and matrix 14 can vary from one region to another. The combination of materials can be selected to provide a desired bulk CTE and other material properties optimized for the operation of component 10. Metal plating 24 is disposed on outer surface 18. Metal plating can include but is not limited to chromium-nickel alloys or alloys containing at least one of nickel, cobalt, copper, iron, palladium, chromium, and cadmium. Metal plating 24 can be selected based on the operational environment of component 10 and performance requirements of component 10, including but not limited to operating temperatures, vibrational impacts, environmental contaminants, impact requirements, etc. Metal plating can have a thickness selected to achieve a desired strength of component 10 while minimizing the amount of weight metal plating 24 adds to substrate 12. Metal plating can have a thickness, for example, in a range of about 0.001 inches (0.0254 mm) to about 0.050 inches (1.27 mm). It may be desirable to provide metal plating 24 with a thickness outside of these ranges for some applications. Metal plating can be disposed directly on outer surface 18 of substrate 12. Metal plating 24 can cover all or portions of outer surface 18.

Figure 2:
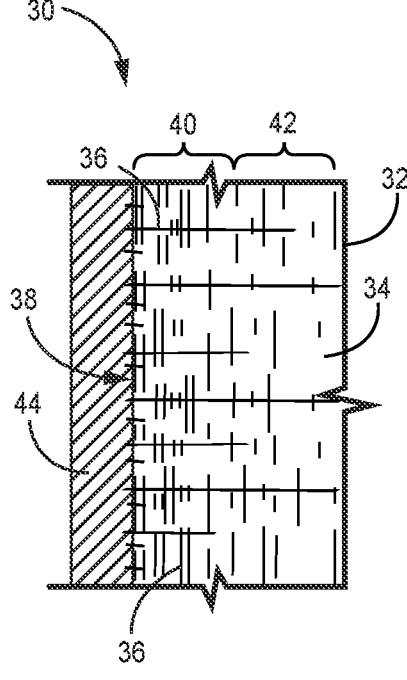
FIG. 2 is a simplified cross-sectional view of a portion of another embodiment of a metal-plated component.

FIG. 2 is a simplified cross-sectional view of a portion of another embodiment of a metal-plated plastic component. FIG. 2 shows component 30, substrate 32, matrix 34, fibers 36, outer surface 38, outer region 40, inner region 42, and metal plating 44. Component 30 can be substantially similar to component 10 with the exception of the placement of fibers 36. Matrix 34 and metal plating 44 can be substantially the same as matrix 14 and metal plating 24 of component 10 shown in FIG. 1 and described with respect thereto. As described further herein, portions of matrix 34 can be provided with or without fibers 36. For example, some regions of substrate 32 can be formed of matrix 34 without fibers 36.

Fibers 36 are embedded in matrix 34. Fibers 36 are selected and arranged to control a bulk coefficient of thermal expansion (CTE) of substrate 32, particularly in outer region 40 and outer surface 38. Fibers 36 are selected and arranged in substrate 32 to reduce a CTE mismatch between substrate 32 and metal plating 44. Substrate 32 with fibers 36 can be designed to have a bulk CTE, particularly in outer region 40 and at outer surface 38, substantially matching a CTE of metal plating 44 to prevent separation of metal plating 44 from outer surface 38 during operation of component 30 in varying temperatures. As further described herein, fibers 36 can be selected and arranged to meet additional functional requirements of component 30 including stress reduction, deflection management, and containment as described further herein.

Fibers 36 can be arranged in a concentration gradient extending from inner region 42 to outer surface 38 with inner region 42 having a lower concentration of fibers 36 than outer region 40. Inner region 42 can be defined as a region internal to component 30 and/or separated from outer surface 38. Outer region 40 is disposed between inner region 42 and outer surface 38 and extending to outer surface 38. In some embodiments, all or a portion of inner region 42 can be free of fibers 36. The arrangement of fibers 36 in this manner (i.e., concentration gradient) can produce a variation in CTE of substrate 12 from inner region 42 through outer region 40, however, the variation in CTE can be tailored to minimize an impact at outer surface 38 or the bond between metal plating 44 and substrate 32.

Fibers 36 can include but are not limited to carbon, metal, para-aramid (e.g., Kevlar® and Twaron®), glass, and combinations thereof. In some embodiments, fibers 36 can be formed of the same material as metal plating 44. In some embodiments, subsets of fibers 36 can be formed of different materials. Regions of substrate 32 can include fibers 36 formed of the same material or different materials. The combinations of materials forming matrix 14 and fiber 16 can vary throughout a component to provide desired material properties.

Fibers 36 can be continuous fibers, discontinuous fibers, or combinations thereof. Fibers 36 can have a filament diameter and length selected to minimize cracking of substrate 32 caused by separation at fiber-matrix interfaces. A concentration and arrangement of fibers 36 across inner region 42 and/or outer region 40 can be selected to provide substrate 32 with a bulk CTE at and adjacent to outer surface 38 substantially matching the CTE of metal plating 44. As shown in FIG. 2, fibers 36 can be provided in greatest concentration adjacent to outer surface 38.

As described with respect to FIG. 1, fibers 36 can be disposed to extend parallel and/or perpendicular or otherwise angled relative to outer surface 38 and metal plating 44. Fibers 36 extending perpendicular to otherwise angled relative to metal plating 44 can extend through outer surface 38. Fibers 36 protruding through outer surface 38 can improve a bond between metal plating 44 and substrate 32. In some embodiments, fibers 36 can be disposed on or at outer surface 38. For example, fibers 36 can form a portion of outer surface 38 with individual fibers 36 separated by matrix 34. Fibers 36 disposed at outer surface 38 or protruding through outer surface 38 can be formed of a material capable of forming a high-strength bond with metal plating 44. Fibers 36 disposed at outer surface 38 or protruding through outer surface 38 can thereby improve a bond between metal plating 44 and substrate 32. For example, fibers 36 disposed at outer surface 38 or protruding through outer surface 38 can be formed of metal. In some embodiments, fibers 36 and metal plating 44 can be the same material. A subset of fibers 36 formed of metal can be provided to improve bonding of metal plating 44, while bulk CTE of substrate 32 can be controlled primarily by a subset of fibers 36 formed of another material (e.g., carbon, para-aramid, or glass).

Selection of fiber 36 material, geometry, orientation relative to metal plating 44 or outer surface 38, and concentration can be made to provide substrate 32 with an expansion rate in outer region 40 in a plane parallel to metal plating 44 not exceeding the expansion rate of metal plating 44, while also improving a bond between substrate 32 and metal plating 44.

Figure 3:
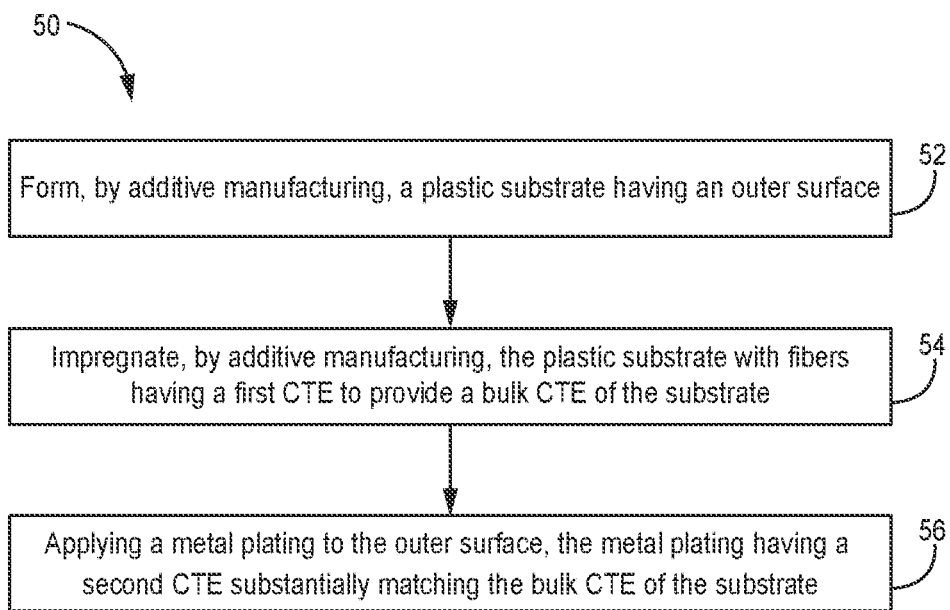
FIG. 3 is a flowchart of a method for forming a metal-plated component.

FIG. 3 is a flowchart of a method forming a metal-plated component according to the present disclosure. FIG. 3 shows method 50. Step 52 includes forming, by an additive manufacturing process, a plastic substrate (e.g., substrate 12 or 32) having an outer surface. The substrate can be formed by 3D plastic printing by depositing a matrix material, such as matrix materials 14 and 34 shown in FIGS. 1 and 2 and described with respect thereto.

Step 54 includes impregnating, by the additive manufacturing process, the substrate with fibers. Fibers can be fibers 16 and 36 shown in FIGS. 1 and 2 and described with respect thereto. As previously described, the fibers can be selected and arranged to provide desired material properties. Fibers can be co-extruded with the matrix material to form the substrate with fibers embedded in the matrix. The addition of fibers to the matrix material produces a substrate with a bulk CTE less than a CTE of the matrix material.

In some embodiments, fibers can be arranged in concentration and/or material gradients as previously described. Fiber arrangement can be controlled by the 3D printing process. In some embodiments, a dual nozzle can be used to extrude materials of different fiber compositions and/or fiber concentrations and selectively print the different material in different regions of the substrate. For example, step 54 can include selectively printing the fibers in a concentration gradient extending from an inner region of the plastic substrate to the outer surface of the plastic substrate, such that the concentration of fibers increases from the inner region toward the outer surface of the plastic substrate. In other embodiments, step 54 can include selectively printing the fibers in a region adjacent to the outer surface of the plastic substrate and/or at an angle relative to the outer surface and/or such that fibers protrude through the outer surface of the plastic substrate to improve bonding with a metal plating applied on the outer surface. In some embodiments, step 54 can include selectively printing the plastic substrate without the fibers (e.g., matrix material only) in an inner region of the plastic substrate.

Step 56 includes applying a metal plating to the outer surface of the substrate. Metal plating can be metal plating 24 and 44 shown in FIGS. 1 and 2 and described with respect thereto. The metal plating can be selectively applied to one or more locations on the outer surface (e.g., locations susceptible to damage by abrasion, etc.). The metal plating has a CTE substantially matching the bulk CTE of the substrate or bulk CTE of the substrate in a region adjacent to the outer surface of the substrate in the location metal plating is to be applied. The metal plating can be applied, for example by electroless plating. In some examples, a printer with a dual nozzle can be used to selectively print a catalyst material layer on all or portions of an outer surface of the substrate. For example, one nozzle can extrude the substrate material (matrix and fiber) and one nozzle can extrude the matrix material loaded with a catalyst. The metal plating can then be formed on the outer surface loaded with the catalyst through a process of electroless plating.

Figure 4:
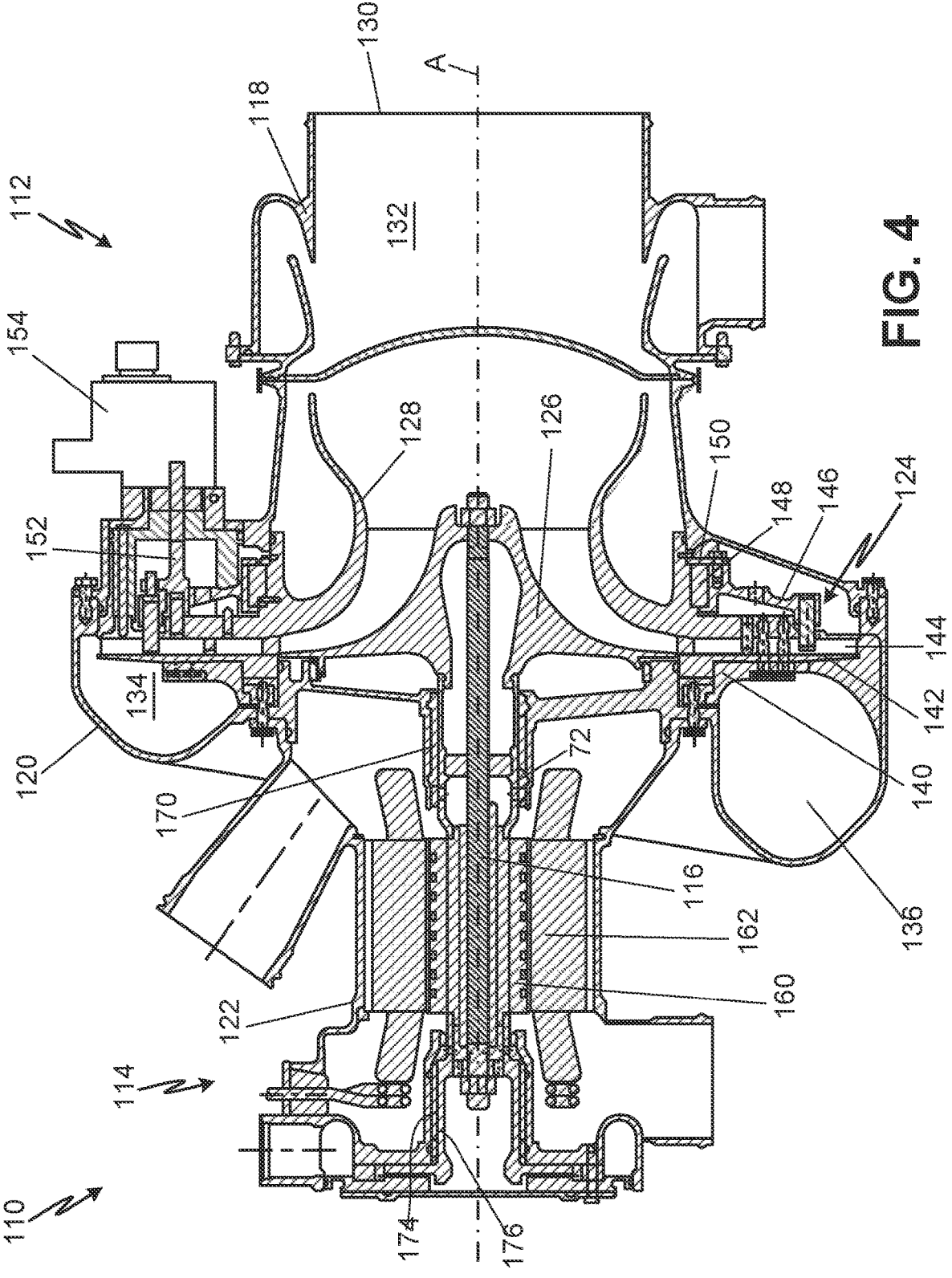
FIG. 4 is a cross-sectional view of a turbomachine.

FIG. 4 is a cross-sectional view of turbomachine 110, which can be a cabin air compressor. Alternatively, turbomachine 110 could be an air cycle machine or other rotary machine. Turbomachine 110 includes compressor section 112, motor section 114, tie rod 116, compressor inlet housing 118, compressor outlet housing 120, motor housing 122, variable diffuser 124, rotor 126, and rotor shroud 128. Compressor inlet housing 118 includes inlet 130 and inlet duct 132. Compressor outlet housing 120 includes outlet duct 134 and outlet 136. Variable diffuser 116 includes backing plate 140, inboard plate 142, diffuser vanes 144, drive ring 146, drive ring bearing 148, backup ring 150, pinion 152, and variable diffuser actuator 154. Motor section 114 includes motor rotor 160 and motor stator 162. Turbomachine 110 further includes first journal bearing 170, first rotating shaft 172, second journal bearing 174, and second rotating shaft 176. FIG. 4 also shows axis A.

Turbomachine 110 includes compressor section 112 and motor section 114 commonly mounted on tie rod 116. Tie rod 116 is configured to rotate about axis A. Compressor section 112 includes compressor inlet housing 118 and compressor outlet housing 120 that are connected to one another. Motor section 114 includes motor housing 122, which is connected to compressor outlet housing 120. Variable diffuser 124 is positioned between compressor inlet housing 118 and compressor outlet housing 120. Rotor 126 is positioned between compressor inlet housing 118 and compressor outlet housing 120. Rotor 126 is mounted on tie rod 116, which rotatably connects rotor 126 and motor section 114. Rotor shroud 128 is positioned radially outward from and partially surrounds compressor rotor 126.

Compressor inlet housing 118 includes inlet 130 and inlet duct 132. Inlet 130 is positioned at a first end of compressor inlet housing 118. Inlet duct 132 extends from inlet 130 through compressor inlet housing 118 to rotor 126. Compressor outlet housing 120 includes outlet duct 134 and outlet 136. Outlet duct 134 extends through compressor outlet housing 120 from rotor 126 to outlet 136.

Variable diffuser 116 includes backing plate 140, inboard plate 142, diffuser vanes 144, drive ring 146, drive ring bearing 148, pinion 150, backup ring 152, and variable diffuser actuator 154. Backing plate 140 abuts compressor outlet housing 120 on a first side and inboard plate 142 on a second side. Inboard plate 142 abuts backing plate 140 on a first side and diffuser vanes 144 on a second side. Diffuser vanes 144 abut inboard plate 142 on a first side and rotor shroud 128 on a second side. Diffuser vanes 144 are configured to direct the compressed air from rotor 126 into outlet duct 134. Drive ring 146 is positioned radially outward from rotor shroud 128, and drive ring bearing 148 is positioned between driver ring 146 and rotor shroud 128. Drive ring 146 abuts rotor shroud 128 on a first side and backup ring 150 on a second side. Backup ring 150 is positioned radially outward of rotor shroud 128. Pinion 152 is connected to variable diffuser actuator 154 and is coupled to drive ring 146. Pinion 152 permits control of variable diffuser 116. Drive ring 146 is coupled to diffuser vanes 144 with pins, and as drive ring 146 is rotated it will drag diffuser vanes 144 and cause them to rotate.

Motor section 114 includes motor housing 122, motor rotor 160, and motor stator 162. Motor housing 122 encases motor rotor 160 and motor stator 162. Motor rotor 160 is disposed within motor stator 162 and is configured to rotate about axis A. Motor rotor 160 is mounted to tie rod 116 to drive rotation of tie rod 116.

Motor rotor 160 of motor section 114 drives rotation of tie rod 116, first rotating shaft 172 and second rotating shaft 176 in turbomachine 110. Tie rod 116 and first rotating shaft 172 in turn rotate rotor 126. The rotation of rotor 126 draws air into inlet 130 of compressor inlet housing 118. The air flows through inlet duct 132 to rotor 126 and will be compressed by rotor 126. The compressed air is then routed through variable diffuser 116 and into outlet duct 134 of compressor outlet housing 120. The air then exits turbomachine 110 through outlet 136 of compressor outlet housing 120 and can be routed to another component of an environmental control system, such as an air cycle machine.

Turbomachine 110 further includes first journal bearing 170, first rotating shaft 172, second journal bearing 174, and second rotating shaft 176. First journal bearing 170 is positioned in compressor section 112 and is supported by compressor outlet housing 120. First rotating shaft 172 extends between and rotates with rotor 126 and motor rotor 160. Motor rotor 160 drives rotation of rotor 126 with first rotating shaft 172. A radially outer surface of first rotating shaft 172 abuts a radially inner surface of first journal bearing 170. Second journal bearing 174 is positioned in motor section 114 and is supported by motor housing 122. Second rotating shaft 176 extends from and rotates with motor rotor 160. A radially outer surface of second rotating shaft 176 abuts a radially inner surface of second journal bearing 174.

Figure 5:
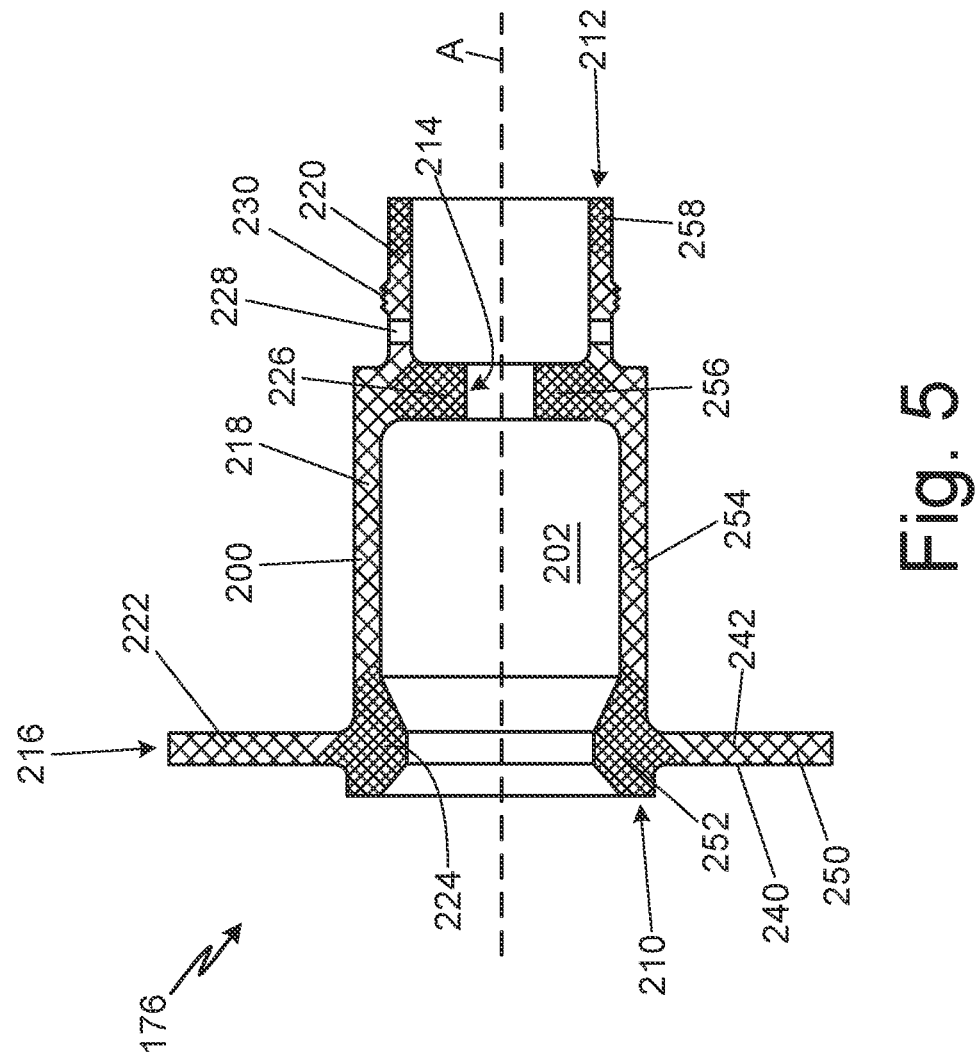
FIG. 5 is a cross-sectional view of a rotating shaft used in the turbomachine of FIG. 4.

FIG. 5 is a cross-sectional view of second rotating shaft 176 from turbomachine 110. Second rotating shaft 176 includes body 200 and bore 202. Body 200 includes first side 210, second side 212, radially inner end 214, radially outer end 216, first shaft portion 218, second shaft portion 220, disk portion 222, rib 224, flange 226, first holes 228, and labyrinth seal 230. As shown in FIG. 3, body 200 further includes outer surface 240 and fiber-reinforced plastic structure 242, which includes first region 250, second region 252, third region 254, fourth region 256, and fifth region 258. FIG. 5 also includes central axis A.

Second rotating shaft 176 includes body 200 with bore 202 extending through a center of body 200. Body 200 has first side 210 and second side 212 opposite of first side 210. First side 210 is on a left side of FIG. 5 and second side 212 is on a right side. Body 200 also has radially inner end 214 and radially outer end 216 opposite of radially inner end 214. Radially inner end 214 of body 200 defines bore 202 extending through body 200 of second rotating shaft 176.

Body 200 includes first shaft portion 218 extending from first end 110 to second shaft portion 220. First shaft portion 218 is cylindrical and extends along central axis A. Second shaft portion 220 extends from first shaft portion 218 to second end 112 of body 200. Second shaft portion 220 is cylindrical and extends along central axis A. Second shaft portion 220 has a smaller inner diameter and a smaller outer diameter than an inner diameter and an outer diameter of first shaft portion 218, respectively. Disk portion 222 extends radially outwards from a first side of first shaft portion 218. Disk portion 222 is a generally flat, disk-shaped portion of body 200.

Rib 224 is adjacent to a first side of first shaft portion 218 and extends radially inwards from first shaft portion 218. Flange 226 is adjacent to a second side of first shaft portion 218 and extends radially inwards form first shaft portion 218. Flange 226 is configured to mount second rotating shaft 176 on a tie rod. Second shaft portion 220 is attached to flange portion 226. First holes 228 include a plurality of holes positioned around second shaft portion 220 near a first side of second shaft portion 220. Labyrinth seal 230 is integrally formed on a radially outer surface of second shaft portion 220. Labyrinth seal 230 is between first holes 228 and second end 212 of second shaft 176.

Body 200 further includes outer surface 240 and fiber-reinforced plastic structure 242. Outer surface 240 is a solid, continuous surface that surrounds fiber-reinforced plastic structure 242. Outer surface 240 can include metal plating, for example metal plating 24 as discussed in relation to FIG. 1 or metal plating 44 as discussed in relation to FIG. 2. The metal plating can be positioned on the entirety of or portions of outer surface 240 to help increase strength and reduce degradation of second rotating shaft 176.

Fiber-reinforced plastic structure 242 can include a matrix (for example, matrix 14 and matrix 34) and a fiber (for example, fiber 16 and fiber 36). Fiber material and arrangement (e.g., orientation and density) can be selected as previously described to control the bulk CTE of fiber-reinforced plastic structure 242 and, particularly a CTE of fiber-reinforced plastic structure 242 in locations of second rotating shaft 176 adjacent to locations where the metal plating is provided to improve a bond between fiber-reinforced plastic structure 242 and the metal plating.

Fiber density in fiber-reinforced plastic structure 242 can vary between regions of second rotating shaft 176. First region 250 is a region of fiber-reinforced plastic structure 242 in disk portion 222 of body 200. Second region 252 is a region of fiber-reinforced plastic structure 242 in a first side of first shaft portion 218 and rib 224 and extending into disk portion 222. Third region 254 is a region of fiber-reinforced plastic structure 242 in first shaft portion 218 and second shaft portion 220. Fourth region 256 is a region of fiber-reinforced plastic structure 242 in flange 226 and extending into first shaft portion 218. Fifth region 258 is a region of fiber-reinforced plastic structure 242 in a second side of second shaft portion 220.

Fiber density can be increased in regions subject to deflection or increased stress during rotation of rotor 126 to aid in deflection management, stress reduction, and energy containment. Fiber-reinforced plastic structure 242 can include regions with varying fiber densities, including first region 250, second region 252, third region 254 and fourth region 256. Density of fiber in fiber-reinforced plastic structure 242 may vary gradually or abruptly between regions. In the embodiment shown in FIG. 5, second region 252, fourth region 256, and fifth region 258 have a greater density than first region 250 and third region 254.

Second rotating shaft 176 is a metal-plated plastic component formed according to the present disclosure and including a fiber-reinforced matrix (also referred to as fiber-reinforced plastic structure 242) as disclosed in FIGS. 1 and 2 and variations thereof. Fibers can be selected and arranged to control thermal expansion of the plastic component relative to the metal plating and a bulk thermal expansion coefficient of second rotating shaft 176 to manage deflection of second rotating shaft 176 during operation. The metal plating on outer surface 240 can be disposed on one or more portions of second rotating shaft 176. In some embodiments, application of the metal plating can be limited to regions susceptible to damage to reduce the weight of second rotating shaft 176.

Traditional rotating shafts for rotary machines have solid cross-sections and are manufactured by subtractive manufacturing processes, such as hogout, or compression molding. Additively manufacturing (or 3D printing) second rotating shaft 176 allows fiber-reinforced plastic structure 242 to have varying densities of fiber and include metal plating on outer surface 240. Using fiber-reinforced plastic structure 242 in second rotating shaft 176 allows second rotating shaft 176 to have a reduced weight compared to traditional rotating shafts while providing deflection control, stress reduction, and energy containment provided in traditional metal rotating shafts. Further, including metal plating on outer surface 240 allows for abrasion resistance in those areas of second rotating shaft 176 with the metal plating.

Figure 6:
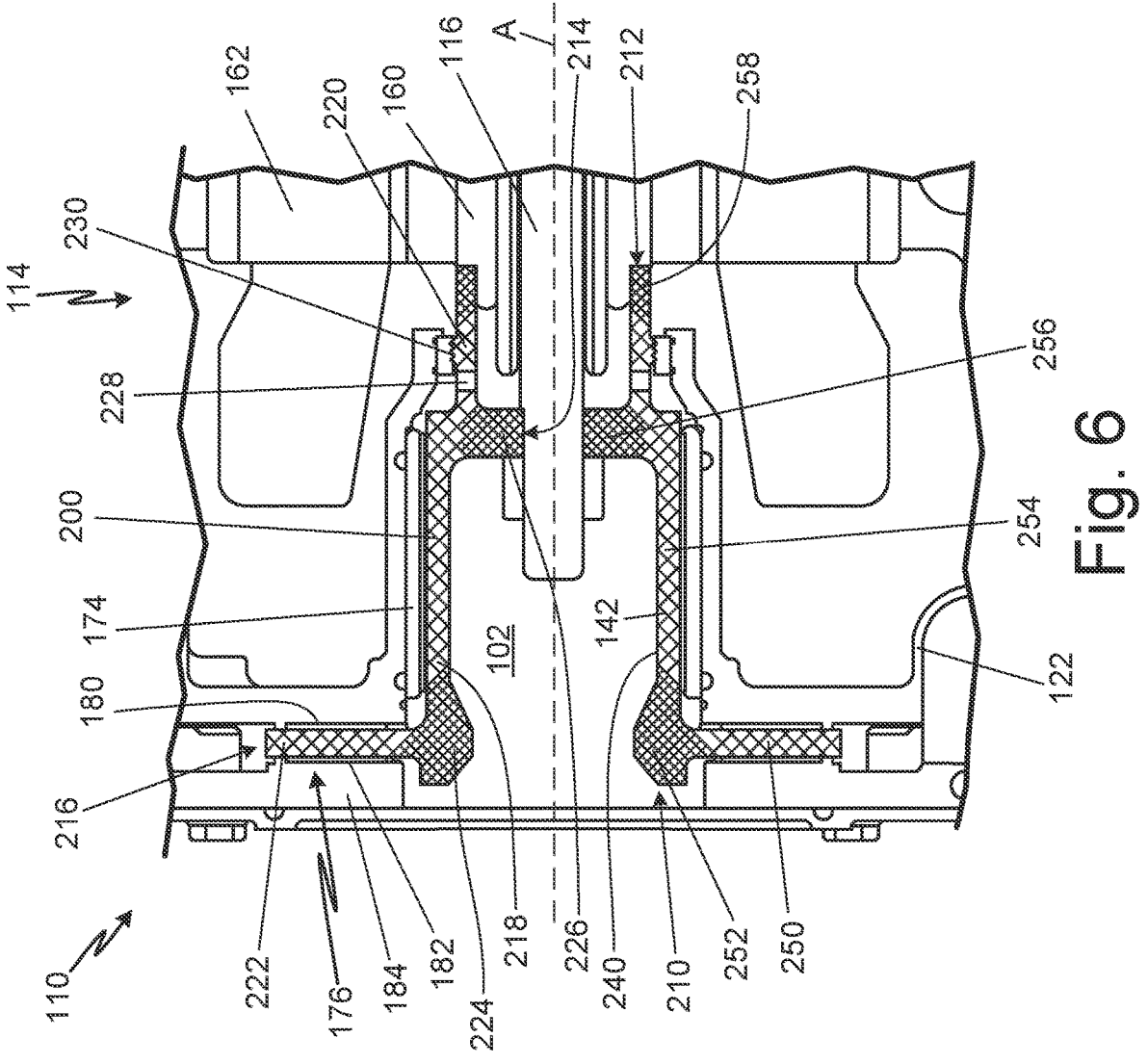
FIG. 6 is a cross-sectional view of the rotating shaft positioned in the turbomachine of FIG. 4.

FIG. 6 is a cross-sectional view of second rotating shaft 176 positioned in turbomachine 110. Turbomachine 110 includes motor section 114, tie rod 116, and motor housing 122. Motor section 114 includes motor rotor 160 and motor stator 162. Turbomachine 110 further includes journal bearing 174, second rotating shaft 176, first thrust bearing 180, second thrust bearing 182, and thrust plate 184. Second rotating shaft 176 includes body 200 and bore 202. Body 200 includes first side 210, second side 212, radially inner end 214, radially outer end 216, first shaft portion 218, second shaft portion 220, disk portion 222, rib 224, flange 226, first holes 228, and labyrinth seal 230. As shown in FIG. 3, body 200 further includes outer surface 240 and fiber-reinforced plastic structure 242, which includes first region 250, second region 252, third region 254, fourth region 256, and fifth region 258. FIG. 6 also shows axis A.

Turbomachine 110 has the structure and design as described above in reference to FIG. 4. Second rotating shaft 176 has the structure and design as described above in reference to FIG. 5. Second rotating shaft 176 is mounted on tie rod 116. Flange 226 mounts second rotating shaft 176 on tie rod 116. A radially outer surface of first shaft portion 218 abuts and rotates against journal bearing 174. A second side of second shaft portion 220 abuts and is mounted to motor rotor 160, causing second rotating shaft 176 to rotate with motor rotor 160. Labyrinth seal 230 on second shaft portion 220 forms a seal against motor housing 122. As second rotating shaft 176 rotates with motor rotor 160 and tie rod 116, labyrinth seal 230 will rotate against motor housing 122, which is a stationary component of turbomachine 110. Disk portion 222 of second rotating shaft 176 is positioned between and rotates against first thrust bearing 180 and second thrust bearing 182.

Second rotating shaft 176 has second region 252 of fiber-reinforced plastic structure 242 in a first side of first shaft portion 118 and rib 224 and extending into disk portion 222. Second region 252 is a deflection region of second rotating shaft 176, which is a region of body 200 of second rotating shaft 176 that is subject to deflection during operation of second rotating shaft 176. As second rotating shaft 176 rotates with tie rod 116 and motor rotor 160, second region 252 will be subject to deflections due to the rotation of second rotating shaft 176. Second region 252 of fiber-reinforced plastic structure 242 is an area of increased density that aids in deflection management during operation of second rotating shaft 176 to reduce and prevent deflection of second rotating shaft 176, increasing the operating efficiency of turbomachine 110.

Increasing the density of fiber-reinforced plastic structure 242 in deflection regions also reduces deflections of thrust plate 184. As second rotating shaft 176 rotates with tie rod 116 in turbomachine 110, disk portion 222 of second rotating shaft 176 rotates against first thrust bearing 180 and second thrust bearing 182. If second rotating shaft 176 deflects, those deflections can be translated to thrust plate 184. Deflections in thrust plate 184 can cause failure of first thrust bearing 180 and/or second thrust bearing 182 and, thus, failure of turbomachine 110. Reducing the deflection and strain and increasing the stiffness of second rotating shaft 176 can prevent deflections in thrust plate 184.

Turbomachine 110 includes clearances between moving components (for example, second rotating shaft 176) and non-moving components (for example, motor housing 122). Clearances reduce contact between moving and non-moving components and resultant damage and/or failure of turbomachine 110. Clearances account for deflections of both moving and non-moving components during operation of turbomachine 110. More deflection in components means larger clearances and reduced efficiency in turbomachine 110 caused by air leaks through the clearances. Reducing deflection by identifying deflection regions (for example, first region 250 and third region 254 of second rotating shaft 176) means clearances can be reduced, thereby increasing efficiency of turbomachine 110. Reducing deflection can be accomplished by increasing stiffness (by increased density of fiber in fiber-reinforced plastic structure 242 or adding metal plating to outer surface 240) in a region.

Second rotating shaft 176 has fourth region 256 of fiber-reinforced plastic structure 242 in flange 226 and extending into first shaft portion 218. Fourth region 256 is a stress region of second rotating shaft 176, which is a region of body 200 of second rotating shaft 176 that is subject to and adapted to withstand high stress during operation of second rotating shaft 176. The stress in stress regions of second rotating shaft 176, such as fourth region 256, is a higher stress than stresses present in other regions of second rotating shaft 176. As second rotating shaft 176 rotates with tie rod 116, flange 226 will rotate with first second rotating shaft 176 and tie rod 116, subjecting fourth region 256 to high stress. Fourth region 256 of fiber-reinforced plastic structure 242 is an area of increased density that aids in stress reduction during operation of second rotating shaft 176 to reduce the stress in fourth region 256 of second rotating shaft 176. Stress reduction at critical points of second rotating shaft 176 leads to increased longevity of second rotating shaft 176.

Second rotating shaft 176 has fifth region 258 of fiber-reinforced plastic structure 242 in a second side of second shaft portion 220. Fifth region 258 is a stress region of second rotating shaft 176, which is a region of body 200 of second rotating shaft 176 that is subject to and adapted to withstand high stress during operation of second rotating shaft 176. The second side of second shaft portion 220 abuts and is mounted to motor rotor 160. The high stress in stress regions of second rotating shaft 176, such as fifth region 258, is a higher stress than stresses present in other regions of second rotating shaft 176. As second rotating shaft 176 rotates with tie rod 116 and motor rotor 160, fifth region 258 in the second side of second shaft portion 220 will be subjected to high stress as it rotates with motor rotor 160. Fifth region 258 of fiber-reinforced plastic structure 242 is an area of increased density that aids in stress reduction during operation of second rotating shaft 176 to reduce the stress in fifth region 258 of second rotating shaft 176. Stress reduction at critical points of second rotating shaft 176 leads to increased longevity of second rotating shaft 176.

Reducing stress in stress regions of second rotating shaft 176 improves the longevity of second rotating shaft 176. Reducing the stresses at stress regions can reduce the failure rate of second rotating shaft 176 as well as the failure rate of turbomachine 110 overall. During operation, these failures can damage components surrounding second rotating shaft 176 and decrease aircraft and passenger safety. Reduced failure rates result in reduced repairs, down time, and operating costs.

Second rotating shaft 176 is one example of a rotating shaft in which fiber-reinforced plastic structure 242 can be used. In alternate embodiments, fiber-reinforced plastic structure 242 can be used in any suitable rotating shaft having any design. Further, turbomachine 110 is one example of a turbomachinery or rotary machine in which second rotating shaft 176 or any other rotating shaft with variable fiber-reinforced plastic structure 242 can be used. In alternate embodiments, second rotating shaft 176 or any other rotating shaft with variable fiber-reinforced plastic structure 242 can be used in an air cycle machine or any other rotary machine.

The disclosed metal-plated plastic rotating shaft components with controlled thermal expansion behavior have an increased durability in environments of varying temperature or temperature gradients. Additional benefits of the disclosed metal-plated components include reduced weight, reduced costs, and faster design, manufacturing, and testing time. Additionally, plastic parts are not prone to static electric charging.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

DISCUSSION OF POSSIBLE EMBODIMENTS

In one aspect, rotating shaft for a rotary machine includes a first shaft portion centered on a central axis and a disk portion extending radially outward from the hub. First shaft portion includes a plastic substrate and metal plating disposed on at least apportion of an outer surface of the plastic substrate. The plastic substrate has a matrix material and fibers embedded in the matrix material. The fibers have a first coefficient of thermal expansion. The metal plating has a second coefficient of thermal expansion. A bulk coefficient of thermal expansion of the plastic substrate at the outer surface of the plastic substrate substantially matches the second coefficient of thermal expansion of the metal plating.

The following are non-exclusive descriptions of possible embodiments of the present invention.

The rotating shaft of the preceding paragraph can optionally include, additionally and/or alternatively, any one or more of the following features, configurations and/or additional components:

In an embodiment of the rotating shaft of the preceding paragraph, the fibers are selected such that at least one of a fiber material, a fiber density, or a fiber orientation is selected so the bulk coefficient of thermal expansion of the plastic substrate at the outer surface of the plastic substrate substantially matches the second coefficient of thermal expansion of the metal plating.

In an embodiment of the rotating shaft of any of the preceding paragraphs, the matrix material can have a third coefficient of thermal expansion, the third coefficient of thermal expansion greater than the first coefficient of thermal expansion of the fibers.

In an embodiment of the rotating shaft of any of the preceding paragraphs, the first coefficient of thermal expansion of the fibers can be less than the second coefficient of thermal expansion of the metal plating.

In an embodiment of the rotating shaft of any of the preceding paragraphs, the fibers can be selected from the group consisting of carbon, para-aramid, glass, metal, and combinations thereof.

In an embodiment of the rotating shaft of any of the preceding paragraphs, the metal plating and the fibers can be the same material.

In an embodiment of the rotating shaft of any of the preceding paragraphs, a fiber density of the fibers embedded in the matrix material varies within the substrate.

In an embodiment of the rotating shaft of any of the preceding paragraphs, the substrate can include a first region having a reduced fiber density and one or more second regions having an increased fiber density. The one or more second regions can be a deflection region or a stress region of the rotating shaft. The deflection region is subject to deflections during operation of the rotary machine. The stress region adapted to withstand higher stress than other regions of the rotating shaft during operation of the rotary machine.

In an embodiment of the rotating shaft of any of the preceding paragraphs, the fiber density gradually transitions between the first region having a reduced fiber density and the one or more second regions having an increased fiber density.

In an embodiment of the rotating shaft of any of the preceding paragraphs, the fiber density abruptly transitions between the first region having a reduced fiber density and the one or more second regions having an increased fiber density.

In an embodiment of the rotating shaft of any of the preceding paragraphs, a rib extends radially inward from an inner surface of the first shaft portion. The rib is near a first side of the first shaft portion. The rib is the deflection region of the rotating shaft.

In an embodiment of the rotating shaft of any of the preceding paragraphs, a disk portion extends radially outward from a first side of the first shaft portion. The disk portion aligns with the rib in the first shaft portion.

In an embodiment of the rotating shaft of any of the preceding paragraphs, a flange extends radially inward from the first shaft portion. The flange is at a second side of the first shaft portion. The flange is the stress region of the rotating shaft.

In an embodiment of the rotating shaft of any of the preceding paragraphs, a second shaft portion extends away from a second side of the first shaft portion. The second shaft portion has a first side attached to the first shaft portion and a second side axially away from the first shaft portion. A region in the second side of the second shaft portion is the stress region of the rotating shaft.

In an embodiment of the rotating shaft of any of the preceding paragraphs, the second shaft portion extending from the flange.

In an embodiment of the rotating shaft of any of the preceding paragraphs, an outer region disposed adjacent to the metal coating has an increased fiber density.

In an embodiment of the rotating shaft of any of the preceding paragraphs, the fibers of the outer region protrude through the outer surface of the plastic substrate.

A method of forming a rotating shaft for a rotary machine includes forming, by an additive manufacturing process, a plastic substrate having an outer surface, impregnating, by the additive manufacturing process, the plastic substrate with fibers having a first coefficient of thermal expansion, and applying a metal plating to the outer surface of the plastic substrate. The metal plating has a second coefficient of thermal expansion and the fibers are selected such that a bulk coefficient of thermal expansion of the plastic substrate at the outer surface of the plastic substrate substantially matches the second coefficient of thermal expansion of the metal plating. The plastic substrate and the metal plating together form the rotating shaft having a first shaft portion extending along and oriented about a central axis.

The method of the preceding paragraph can optionally include, additionally and/or alternatively, any one or more of the following features, configurations, additional components, and/or steps:

In an embodiment of the method of the preceding paragraph, a fiber material, a fiber density, or a fiber orientation is selected such that the bulk coefficient of thermal expansion of the plastic substrate at the outer surface of the plastic substrate substantially matches the second coefficient of thermal expansion of the metal plating.

In an embodiment of the method of any of the preceding paragraphs, the additive manufacturing process can be 3D printing.

In an embodiment of the method of any of the preceding paragraphs, the step of impregnating can include selectively printing the fibers to vary a fiber density in the plastic substrate.

In an embodiment of the method of any of the preceding paragraphs, to form a region of increased fiber density adjacent to the portion of the outer surface of the plastic substrate to which the metal plating is applied.

In an embodiment of the method of any of the preceding paragraphs, the step of impregnating can include selectively printing fibers at an angle relative to the portion of the outer surface to which the metal plating is applied.

In an embodiment of the method of any of the preceding paragraphs, the plastic of the plastic substrate can have a third coefficient of thermal expansion, the third coefficient of thermal expansion greater than the first coefficient of thermal expansion of the fibers.

In an embodiment of the method of any of the preceding paragraphs, the first coefficient of thermal expansion of the fibers can be less than the second coefficient of thermal expansion of the metal plating.

In an embodiment of the method of any of the preceding paragraphs, the fibers can be selected from the group consisting of carbon, para-aramid, glass, metal, and combinations thereof.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A rotating shaft for a rotary machine comprising:
   a first shaft portion extending along and oriented about a central axis, the first shaft portion comprising:
   a plastic substrate, the plastic substrate comprising:
   a matrix material; and
   fibers embedded in the matrix material, the fibers having a first coefficient of thermal expansion; and
   a metal plating disposed on at least a portion of an outer surface of the plastic substrate, the metal plating having a second coefficient of thermal expansion,
   wherein a bulk coefficient of thermal expansion of the plastic substrate at the outer surface of the plastic substrate substantially matches the second coefficient of thermal expansion of the metal plating; and
   wherein the substrate comprises regions of varying fiber density and wherein an outer region disposed adjacent to the metal coating has an increased fiber density.

2. The rotating shaft of claim 1, wherein the matrix material has a third coefficient of thermal expansion, the third coefficient of thermal expansion greater than the first coefficient of thermal expansion of the fibers.

3. The rotating shaft of claim 2, wherein the first coefficient of thermal expansion of the fibers is less than the second coefficient of thermal expansion of the metal plating.

4. The rotating shaft of claim 1, wherein the fibers are selected from the group consisting of carbon, para-aramid, glass, metal, and combinations thereof.

5. The rotating shaft of claim 4, wherein the metal plating and the fibers are the same material.

6. The rotating shaft of claim 1, wherein the substrate comprises:
   a first region having a reduced fiber density; and
   one or more second regions having an increased fiber density;
   wherein the one or more second regions is a deflection region and/or a stress region of the rotating shaft, wherein the deflection region is subject to deflections during operation of the rotary machine, and wherein the stress region is adapted to withstand higher stress than other regions of the rotating shaft during operation of the rotary machine.

7. The rotating shaft of claim 6, wherein the rotating shaft further comprises:

a rib extending radially inward from an inner surface of the first shaft portion;

wherein the rib is near a first side of the first shaft portion; and wherein the rib is the deflection region of the rotating shaft.

8. The rotating shaft of claim 6, and further comprising:

a flange extending radially inward from the first shaft portion;

wherein the flange is at a second side of the first shaft portion; and wherein the flange is the stress region of the rotating shaft.

9. The rotating shaft of claim 6, and further comprising:

a second shaft portion extending away from a second side of the first shaft portion, the second shaft portion having a first side attached to the first shaft portion and a second side axially away from the first shaft portion;

wherein a region in the second side of the second shaft portion is the stress region of the rotating shaft.

10. The rotating shaft of claim 1, wherein the fibers of the outer region protrude through the outer surface of the plastic substrate.

11. The rotating shaft of claim 10, wherein fibers of the outer region are angled with respect to the outer surface of the plastic substrate.

12. A method of forming the rotating shaft of claim 1, the method comprising:

forming, by an additive manufacturing process, the plastic substrate;

impregnating, by the additive manufacturing process, the plastic substrate with the fibers; and applying the metal plating to at least the portion of the outer surface of the plastic substrate.

13. The method of claim 12, wherein the additive manufacturing process is 3D printing.

14. The method of claim 13, wherein the step of impregnating comprises selectively printing the fibers to vary a fiber density in the plastic substrate.

15. The method of claim 14, wherein the step of impregnating comprises:

selectively printing fibers to form the region of increased fiber density adjacent to the portion of the outer surface of the plastic substrate to which the metal plating is applied; and/or selectively printing fibers at an angle relative to the portion of the outer surface to which the metal plating is applied.

16. The method of 14, wherein the plastic of the plastic substrate has a third coefficient of thermal expansion, the third coefficient of thermal expansion greater than the first coefficient of thermal expansion of the fibers.

17. The method of 16, wherein the first coefficient of thermal expansion of the fibers is less than the second coefficient of thermal expansion of the metal plating.

18. The method of claim 17, wherein the fibers are selected from the group consisting of carbon, para-aramid, glass, metal, and combinations thereof.

19. A rotating shaft for a rotary machine comprising:

a first shaft portion extending along and oriented about a central axis, the first shaft portion comprising:

a plastic substrate, the plastic substrate comprising:

a matrix material; and fibers embedded in the matrix material, the fibers having a first coefficient of thermal expansion;

wherein the substrate comprises regions of varying fiber density including:

a first region having a reduced fiber density; and one or more second regions having an increased fiber density;

wherein the one or more second regions is a deflection region and/or a stress region of the rotating shaft, wherein the deflection region is subject to deflections during operation of the rotary machine, and wherein the stress region is adapted to withstand higher stress than other regions of the rotating shaft during operation of the rotary machine;

a metal plating disposed on at least a portion of an outer surface of the plastic substrate, the metal plating having a second coefficient of thermal expansion, wherein a bulk coefficient of thermal expansion of the plastic substrate at the outer surface of the plastic substrate substantially matches the second coefficient of thermal expansion of the metal plating; and at least one of:

a rib extending radially inward from an inner surface of the first shaft portion, wherein the rib is near a first side of the first shaft portion and is the deflection region of the rotating shaft;

a flange extending radially inward from the first shaft portion, wherein the flange is at a second side of the first shaft portion and is the stress region of the rotating shaft; and a second shaft portion extending away from a second side of the first shaft portion, the second shaft portion having a first side attached to the first shaft portion and a second side axially away from the first shaft portion, wherein a region in the second side of the second shaft portion is the stress region of the rotating shaft.

* * * * *